United States Patent Office 3,804,835
Patented Apr. 16, 1974

3,804,835
PYRIDO[2,3-d]PYRIMIDIN-4-(3H)-ONES
Fritz Wiedemann and Max Thiel, Mannheim, Kurt Stach, Mannheim-Waldhof, Egon Roesch, Lampertheim, and Klaus Hardebeck, Ludwigshafen (Rhine), Germany, assignors to Boehringer Mannheim GmbH, Mannheim, Germany
No Drawing. Filed Mar. 9, 1971, Ser. No. 122,497
Claims priority, application Germany, Mar. 28, 1970,
P 20 14 978.4
The portion of the term of the patent subsequent
to July 31, 1990, has been disclaimed
Int. Cl. C07d 57/20
U.S. Cl. 260—256.4 F        5 Claims

ABSTRACT OF THE DISCLOSURE

Pyrido[2,3-d]pyrimidin-4(3H)-ones of the general formula

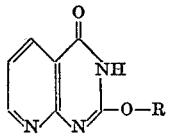

wherein

R is a straight or branched-chain lower alkyl, which can be substituted by hydroxyl groups or alkoxy radicals, or an alkenyl radical, and the salts thereof with physiologically compatible acids and bases.

These compounds exhibit long-lasting diuretic action.

---

The present invention is concerned with new pyrido[2,3-d]pyrimidin-4(3H)-ones and with the preparation thereof and is also concerned with pharmaceutical compositions containing these new compounds and their use.

The new pyrido[2,3-d]pyrimidin-4(3H)-ones according to the present invention are compounds of the general formula:

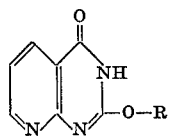

wherein

R is a straight or branched-chain lower alkyl, which can be substituted by hydroxyl groups or alkoxy radicals, or an alkenyl radical, and the salts thereof with physiologically compatible acids and bases.

We have now found that the new Compounds I are characterized by a good diuretic and naturiuretic action.

The new Compounds I according to the present invention can be prepared, for example, by the reaction of compounds of the general formula:

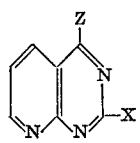

with compounds of the general formula:

R—Y     (III)

wherein R has the same meaning as above, Z is a hydroxyl group or a group which can be converted into a hydroxyl group, and one of the symbols X and Y represents a reactive group, whereas the other represents a hydroxyl or alcoholate group; if Z is not a hydroxyl group, it is subsequently converted into a hydroxyl group. If desired, thereafter the compounds are converted into their physiologically compatible salts.

As reactive groups X and Y in the above-given general formulae, there are preferably used halogen atoms, especially chlorine atoms, or nitrile, sulfhydril, alkylthio, benzylthio or alkyl-sulfonyl or sulfonate radicals. In the case of Compounds III, Y is preferably the residue of an alcoholate group, such as an alkali or alkaline earth metal alkoxide or alkenoxide, e.g. sodium alcoholate.

Residues which can be converted into the hydroxyl group are, in particular, the amino, alkoxy, aryloxy, mercapto or alkylthio radicals. The condensation reaction according to the present invention is advantageously carried out in the presence of a solvent, as well as possibly in the presence of a base; expediently, there is used the alcohol corresponding to the compound RY. For acceleration of the reaction, it is possible to work at an elevated temperature.

The subsequent conversion of compounds in which Z signifies an amino group into the corresponding hydroxyl compounds is carried out in the usual manner by diazotization and boiling. The conversion of alkoxy, aryloxy, mercapto or alkylthio radicals into hydroxyl groups takes place by hydrolysis, preferably in the alkaline range.

For conversion into salts, the Compounds I are mixed for example, in aqueous solution, with the calculated amount of a physiologically compatible acid or base and the reaction mixture then evaporated to dryness in a vacuum.

For the use of the new compounds according to the present invention as pharmaceuticals with diuretic or naturiuretic action, there can, in principle, be used all the conventional enteral and parenteral forms of administration. For this purpose, the active material is mixed with solid or liquid pharmaceutical carriers or diluents and brought into a suitable form.

Examples of solid carrier materials include lactose, mannitol, starch, talc, methyl-cellulose, gelatin and the like, to which, if desired, can be added coloring matter and/or flavorings. Because of the low solubility of the new compounds according to the present invention, very few solvents can be used for injectable solutions, e.g. dimethyl sulfoxide. Therefore, higher concentrations are preferably administered in the form of suspensions.

In human medicine, in the case of enteral administration, amounts of active material of between 10 and 500 mg. per day in 1 to 4 individual doses have proved to be satisfactory; in the case of intravenous administration, the most favorable amount of active material is between 5 and 100 mg. per day.

The new compounds according to the present invention, which are characterized by a good and surprisingly long-lasting (6–24 hours) diuretic action, bring about in the organism an increased excretion of sodium ions without thereby influencing the excretion of potassium ions. In this way, the new compounds according to the present invention differ from the previously known diuretics which either brought about an increased excretion of sodium and potassium ions or brought about an excretion of sodium ions with a simultaneous retention of potassium ions. Thus, the new compounds according to the present invention provide the physician with a new means of treating patients with a disturbed sodium balance but with a normal potassium balance.

The following examples are given for the purpose of illustrating the present invention.

EXAMPLE 1

2-methoxy-pyrido[2,3-d]pyrimidin-4(3H)-one 4.53 g. of 2-chloropyrido[2,3-d]pyrimidin-4(3H)-one (cf. U.S. patent specification No. 2,697,710) are boiled under reflux for 25 hours in a solution of sodium methylate prepared from 1.15 g. of sodium and 100 ml. of methanol. Thereafter, the reaction mixture is evaporated to dryness in a vacuum and the residue is taken up in 40 ml. of water, treated with activated charcoal and filtered, the filtrate being adjusted to a pH of 5–6 by the addition of 2 N hydrochloric acid. After filtering off the precipitated product with suction and recrystallizing it from methanol, there are obtained 2.2 g. (50% of theory) of 2 - methoxy-pyrido[2,3 - d]pyrimidin - 4(3H)-one in the form of colorless crystals which sinter above 272° C. and decompose at about 290° C.

The compound can be converted in conventional manner into its hydrochloride (M.P. >300° C.) and into its sufate (M.P. about 290° C.; decomp.). It also forms a sodium salt which decomposes at 180–210° C.

EXAMPLE 2

2-ethoxy-pyrido[2,3-d]pyrimidin-4(3H)-one (a) 3.62 g. of 2-chloropyrido[2,3-d]pyrimidin-4(3H)-one are boiled under reflux for 3 hours in a solution of sodium ethylate prepared from 1.15 g. of sodium and 75 ml. of ethanol. The reaction mixture is evaporated to dryness in a vacuum, whereupon the residue is taken up in water, the solution is adjusted to pH 6 with 2 N hydrochloric acid and the solution then extracted with chloroform. The chloroform extract is evaporated and the residue obtained is recrystallized from water, with the use of activated charcoal, to give 0.8 g. (21% of theory) of 2 - ethoxy - pyrido[2,3-d]pyrimidin-4(3H)-one in the form of colorless crystals which melt at 173–175° C. The corresponding hydrochloride melts at >300° C. The compound exhibits polymorphism; a further crystalline modification melts at 194–195° C., after recrystallization from water-methanol;

(b) In an analogous manner, from 2-chloropyrido[2,3-d]pyrimidin-4(3H)-one and sodium propylate in n-propanol or sodium isopropylate in isopropanol, there are prepared: 2-n-propoxy-pyrido[2,3-d]pyrimidin-4(3H)-one in the form of colorless crystals which, after recrystallization from water, melt at 166–168° C.; and (c) 2 - isopropoxy-pyrido[2,3-d]pyrimidin-4(3H)-one in the form of colorless crystals which, after recrystallization from benzene, melt at 160–162° C.

EXAMPLE 3

2-(β-hydroxy-ethoxy)-pyrido[2,3-d]pyrimidin-4(3H)-one 1.01 g. of sodium is dissolved in 50 ml. of ethylene glycol, 3.6 g. of 2-chloropyrido[2,3-d]pyrimidin-4(3H)-one are added thereto and the reaction mixture is heated on a boiling waterbath for five hours. After the addition of water, the pH of the reaction mixture is adjusted to 5 with 2 N hydrochloric acid and the product, which slowly crystallizes out, is filtered off with suction. There are obtained 3.0 g. (72.5% of theory) of colorless crystals which, after recrystallization from water, melt at 240–242° C.

EXAMPLE 4

2-(β-methoxy-ethoxy)-pyrido[2,3-d]pyrimidin-4(3H)-one 3.6 g. of 2-chloropyrido[2,3-d]pyrimidin-4(3H)-one are heated on a boiling waterbath for 5 hours in an alcoholate solution prepared from 1.38 g. of sodium and 100 ml. of ethylene glycol monomethyl ether. The reaction mixture is then evaporated to dryness in a vacuum, whereafter the residue is taken up in 80 ml. of water, adjusted to a pH of 5 with 2 N hydrochloric acid and extracted with chloroform. The chloroform extract is evaporated and the residue is recrystallized from ethanol, with the use of active charcoal. There are obtained 3.8 g. (81.5% of theory) of 2-(β-methoxy-ethoxy)-pyrido[2,3-d]pyrimidin-4(3H)-one in the form of colorless crystals with a melting point of 155–157° C.

EXAMPLE 5

2-allyloxy-pyrido[2,3-d]pyrimidin-4(3H)-one 3.6 g. of chloropyrido[2,3-d]pyrimidin-4(3H)-one are heated at 100° C. for 10 hours in an alcoholate solution prepared from 1.84 g. of sodium and 100 ml. of allyl alcohol. The reaction mixture is thereafter mixed with water, the pH adjusted to 5–6 with 2 N hydrochloric acid and then extracted with chloroform. The chloroform extract is evaporated and the residue recrystallized from ethanol, with the use of activated charcoal. There are obtained 2.1 g. (51.8% of theory) of 2-allyloxy-pyrido[2,3-d]pyrimidin-4(3H)-one in the form of colorless crystals which melt at 134–136° C.

The activity of the novel compounds was demonstrated as follows:

Female Sprague Dawley rats having an average weight of 180 grams were maintained in a fasting condition overnight but were allowed an unlimited amount of drinking water. These rats were maintained for at least one week prior to the experiments in climatized rooms held at 23°±1° C. and at a relative humidity of 60±5%. During the experiments the animals were placed into metabolic cages, 5 rats per cage. The test compound was administered orally and intraperitoneally in an amount of 25 mg./kg. in a 0.5% methyl cellulose solution (10 ml./kg.). Before starting the experiments and after 2 hours had elapsed, and again after six hours had elapsed, the animals' bladders were pressed out and the volume of urine measured and the chloride content of the urine determined titrametrically and Na+ and K+ flame photometrically. As a comparison, there was also tested 2,4-dihydroxy-pyrido[2,3-d]pyrimidin (Compound A, Robins, Am. Soc., vol. 77, p. 2256, 1955). The results are set forth in the following table.

TABLE

| | Excretion/kg. during— | | | | | | | | |
|---|---|---|---|---|---|---|---|---|---|
| | 2 hours | | | | | 6 hours | | | |
| Test compound | Ml. urine | Cl | mVal Na | K | Na/K | Ml. urine | Cl | mVal Na | K | Na/K |
| Control | 9 | 0.05 | 0.10 | 0.22 | 0.5 | 13 | 0.39 | 0.43 | 0.62 | 0.7 |
| Compound A | 9 | 0.002 | 0.19 | 0.22 | 0.8 | 20 | 0.87 | 1.1 | 0.79 | 1.3 |
| Example: | | | | | | | | | | |
| 1 | 12 | 0.94 | 1.2 | 0.12 | 9.9 | 27 | 2.8 | 3.2 | 0.45 | 7.0 |
| 2a | 8 | 0.60 | 0.61 | 0.18 | 3.4 | 12 | 3.9 | 3.5 | 1.1 | 3.2 |
| 2b | 13 | 0.41 | 0.63 | 0.39 | 1.6 | 18 | 0.85 | 1.1 | 0.72 | 1.5 |
| 2c | 19 | 0.56 | 0.85 | 0.32 | 2.5 | 37 | 2.5 | 2.5 | 1.1 | 2.2 |
| 3 | 13 | 0.50 | 0.41 | 0.26 | 1.6 | 23 | 1.5 | 1.1 | 0.82 | 1.3 |
| 4* | 20 | 1.6 | 1.7 | 0.27 | 6.1 | 48 | 3.4 | 3.1 | 0.63 | 5.0 |
| | 15 | 1.4 | 1.2 | 0.18 | 6.5 | 41 | 4.7 | 3.7 | 0.65 | 5.8 |
| 5 | 18 | 0.67 | 0.72 | 0.33 | 2.2 | 44 | 3.6 | 3.3 | 1.4 | 2.4 |

*Two trials.

From the foregoing table it can be seen that the potassium content of the urine is not substantially changed by administration of the novel compounds either in 2 hours or in 6 hours. On the other hand, the sodium content is clearly increased several-fold. Thus, the sodium/potassium ratios are much higher using the novel compounds, permitting them to be used where a selective effect on the sodium content is desired. Moreover, the compounds have a pronounced diuretic effect as can be seen from the marked increase in urine excretion, some of the compounds producing this effect to a considerable degree even in only two hours.

It will be appreciated that the instant specification and examples are set forth by way of illustration and not limitation, and that various modifications and changes may be made without departing from the spirit and scope of the present invention.

What is claimed is:

1. A pyrido[2,3-d]pyrimidin-4(3H)-one of the formula

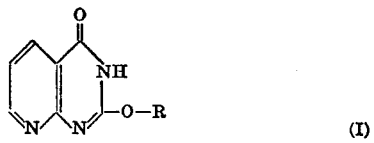

(I)

wherein R is alkyl of 1 to 3 carbon atoms which can be substituted by hydroxy or methoxy, or allyl.

2. Compound according to claim 1 wherein such compound is 2-methoxy-pyrido[2,3-d]pyrimidin-4(3H)-one.

3. Compound according to claim 1 wherein such compound is 2-(β-methoxy-ethoxy)-pyrido[2,3-d]pyrimidin-4(3H)-one.

4. Compound according to claim 1, wherein such compound is 2 - isopropoxy-pyrido[2,3-d]pyrimidin-4(3H)-one.

5. Compound according to claim 1, wherein such compound is 2-allyloxy-pyrido[2,3-d]pyrimidin-4(3H)-one.

References Cited
UNITED STATES PATENTS

| 2,686,781 | 8/1954 | Hitchings et al. | 260—256.4 F |
| 3,134,778 | 5/1964 | Weinstock et al. | 260—256.4 F |
| 3,186,991 | 6/1965 | Ohnacker | 260—256.4 F |

RICHARD J. GALLAGHER, Primary Examiner

U.S. Cl. X.R.

424—251